Dec. 16, 1952   R. L. SMITH   2,621,831
POURING SPOUT
Filed Nov. 18, 1948   2 SHEETS—SHEET 1
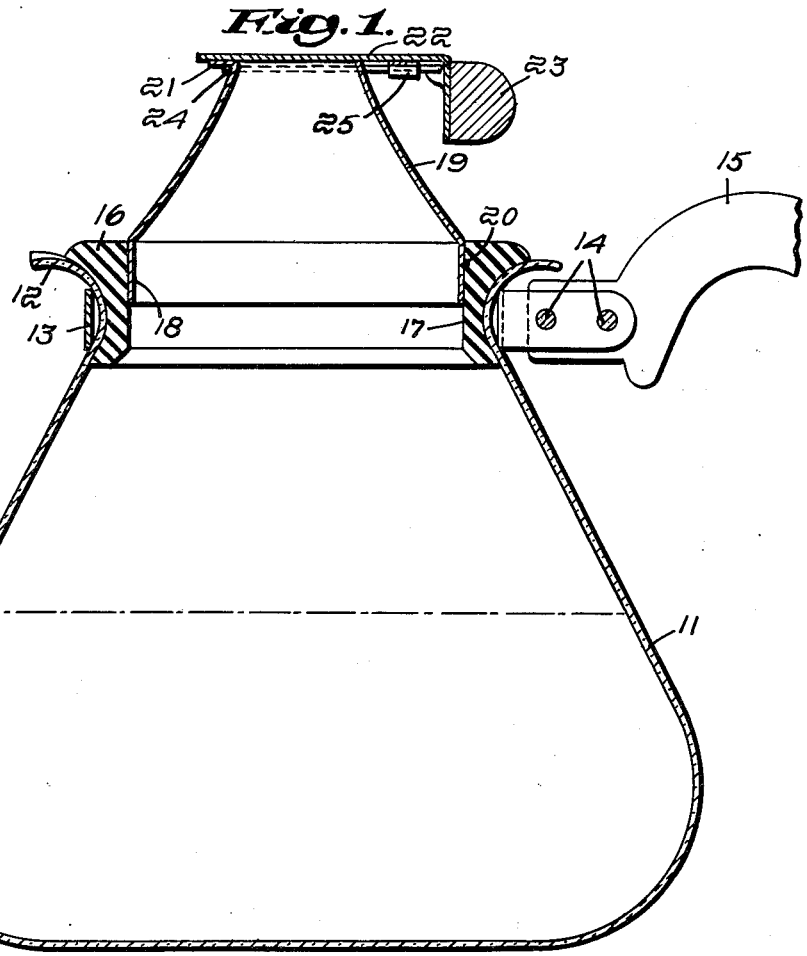
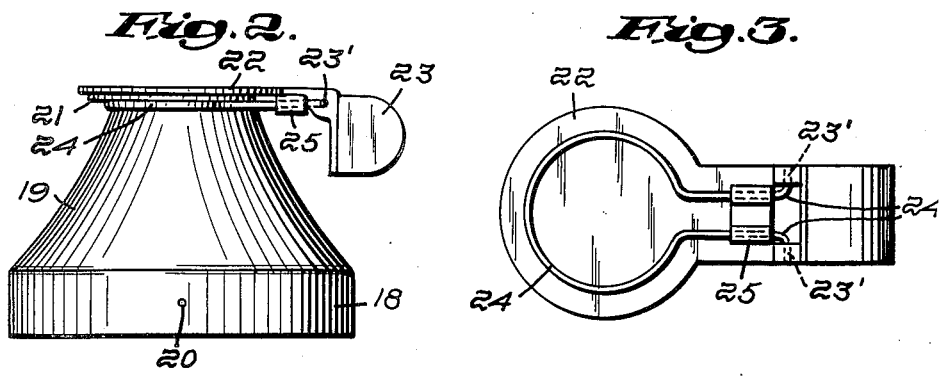
Inventor:
Roland L. Smith,
By Kenway, Jenney, Witter & Hildreth
Attorneys Dec. 16, 1952 R. L. SMITH 2,621,831
POURING SPOUT
Filed Nov. 18, 1948 2 SHEETS—SHEET 2
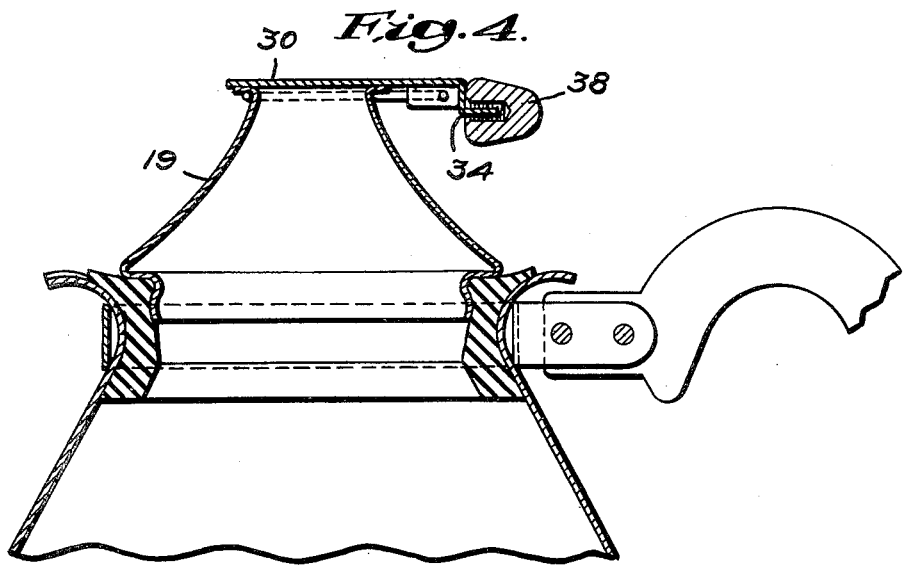
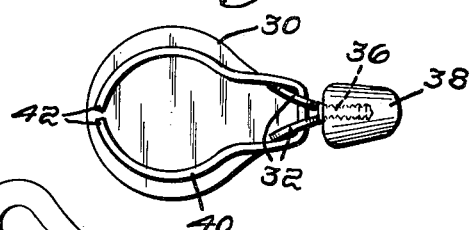
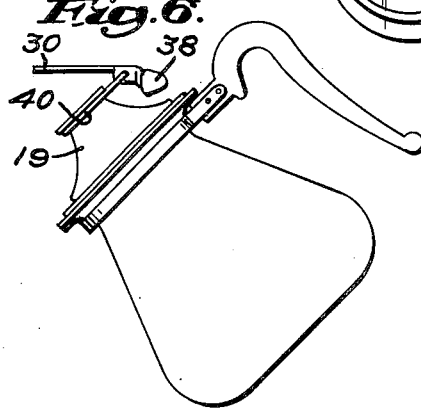
Inventor:
Roland L. Smith,
by Kenway, Jenney, Witter & Hildreth
Attorneys Patented Dec. 16, 1952

2,621,831

UNITED STATES PATENT OFFICE 2,621,831

POURING SPOUT

Roland L. Smith, Belmont, Mass.

Application November 18, 1948, Serial No. 60,680

2 Claims. (Cl. 222—500)

This invention relates to improvements in anti-drip pouring spouts and counterweighted covers therefor, and is a continuation in part of my prior application, Serial No. 640,180, filed January 10, 1946, now Patent 2,478,787.

Although useful with any vessel for holding liquids, my present invention is especially applicable to coffee pots and will be so illustrated in the accompanying drawings wherein:

Fig. 1 is a sectional side elevation of a coffee pot equipped with my invention, Fig. 2 is a side elevation of the pouring spout, removed, Fig. 3 is a bottom plan view of the counterweighted cover and its mounting, Fig. 4 is a sectional side elevation of a coffee pot provided with a cover of modified construction, Fig. 5 is a bottom plan view of the counterweighted cover and mounting shown in Fig. 4, and Fig. 6 is a fragmentary view showing the spout in pouring position.

I have indicated generally at 11 a coffee pot or other liquid holding vessel. Pot 11 is relatively broad at its bottom, and relatively narrow at its top, the top being open and outwardly flared as indicated at 12. The pot 11 may be made of any suitable material, but for cleanliness and utility, I prefer to use glass.

Extending around the outer surface of the outwardly flared portion 12 of the top is a band 13 preferably of metal, to the ends of which is secured, as by screws or the like 14, a handle 15, usually of a poor heat conducting material, as wood or the like.

Fitting closely into the opening at the top of pot 11 is a gasket 16 of resilient material. The outer circumference of gasket 16 is shaped to conform generally with the shape of the opening at the top of pot 11. Gasket 16 is also provided with a circular passage 17 to receive, in a relatively tight fit, the lower skirt portion 18 of a pouring spout 19. Skirt portion 18 is provided with outwardly extending spaced projections 20 which engage with the resilient material of the gasket 16 and assist in holding the pouring spout 19 in position. Such projections may however be a continuous bead if desired.

The pouring spout 19 is in the form of a truncated cone and the upper end thereof is extended horizontally outwardly to form an antidrip pouring flange or lip 21. Fitting on the top of flange 21 is a cover 22 having secured thereto or formed integral therewith a counterweight 23.

Counterweight 23 is pivotally mounted on the ends of a wire 24 extending around the top of the pouring spout 19 below the lip 21, the ends of the wire 24 being held in position by a clasp 25.

Preferably, the ends of the wire are out-turned at approximately right angles from each other as at 24' (see Fig. 3) to fit within alined holes 23' in counterweight 23. Clasp 25 is slidable longitudinally along the arms of the wire, being constructed to provide a connected pair of loops, one of which is non-detachably engaged with one arm of the wire and the other of which is detachably engaged with the other arm. By pressing the arms toward each other, the arm which is detachably fastened to the clasp may be disengaged therefrom by swinging the clasp about the other arm as a fulcrum. This is an advantage when initially assembling the structure, and also should any of the parts subsequently require replacement. The clasp and method of anchoring the wire tightly on the spout also prevents the cover unit from swiveling laterally with respect to the pouring opening of spout 19 when in use on the device.

The cover or lid 22 is so constructed, that when in association with the pivoted counterweight or handle 23, it will tend to remain in engagement with the projecting lip 21 of the pouring spout 19 when the pot is in upright position. The cover or lid 22 in coaction with lip 21 will thus act to prevent drip of the coffee or other liquid immediately the pouring operation is discontinued and the pivoted weight or handle 23 released. The counterweight serves automatically to open the cover when the pot is tipped to pouring position.

In Figs. 4, 5 and 6 I have illustrated a modified cover construction embodying a sheet metal cover 30 having a lateral portion provided with two downwardly turned ears 32 and terminating in an end 34 provided with thread-like edges 36 for receiving a counterweight 38 in threaded engagement therewith. The ears 32 are perforated to receive a wire bail 40. The two ends 42 are at the forward end of the bail and the bail is assembled by passing one of the ends through the perforations. The bail clips around and tightly grips the neck of the spout 19 as will be understood. The counterweight serves automatically to open the cover when the pot is tipped to pouring position as shown in Fig. 6.

Having thus described my invention, what I claim as new and desire to secure by Letters Patent is:

1. A pouring spout for coffee pots and the like, comprising a shell of truncated conical configuration and having a relatively large mouth at one end for engaging the open mouth end of a pot and a smaller pouring mouth having an outwardly extending flange at the other end, a one-piece wire bail extending about and engaging the shell adjacent to the flange, the flange serving as a stop for supporting the bail on the shell and serving as an anti-drip lip for the shell, a cover having two downwardly extending ears pivotally connected to the bail, the cover having a portion forwardly of the pivot for covering the pouring mouth and a portion extending rearwardly of the pivot, and a cover counterbalancing weight on the rearwardly extending portion.

2. The pouring spout defined in claim 1 in which the counterbalancing weight is removably screw threaded to said rearwardly extending portion.

ROLAND L. SMITH.

REFERENCES CITED

The following references are of record in the file of this patent:

UNITED STATES PATENTS

| Number | Name | Date |
|---|---|---|
| 1,264,481 | Benedict | Apr. 30, 1918 |
| 1,814,083 | Flautt | July 14, 1931 |
| 1,918,117 | Martin | July 11, 1933 |
| 2,087,664 | Cory | July 20, 1937 |